(12) United States Patent
Wright et al.

(10) Patent No.: US 11,397,416 B2
(45) Date of Patent: Jul. 26, 2022

(54) INTELLIGENT MOTION CONTROL THROUGH SURFACE SCAN COMPARISON AND FEATURE RECOGNITION

(71) Applicant: PRECISION BUILDING GROUP, San Luis Obispo, CA (US)

(72) Inventors: Erik Wright, San Luis Obispo, CA (US); Christopher Steven Clay, Davis, CA (US)

(73) Assignee: PRECISION BUILDING GROUP, San Luis Obispo, CA (US)

( * ) Notice: Subject to any disclaimer, the term of this patent is extended or adjusted under 35 U.S.C. 154(b) by 651 days.

(21) Appl. No.: 16/393,771

(22) Filed: Apr. 24, 2019

(65) Prior Publication Data

US 2019/0332082 A1    Oct. 31, 2019

Related U.S. Application Data

(60) Provisional application No. 62/662,687, filed on Apr. 25, 2018.

(51) Int. Cl.
*G05B 13/04* (2006.01)
*G05B 19/18* (2006.01)
(Continued)

(52) U.S. Cl.
CPC ......... *G05B 19/182* (2013.01); *G05B 13/041* (2013.01); *G05B 19/19* (2013.01); *G05B 19/40932* (2013.01); *G05B 2219/37355* (2013.01); *G05B 2219/37365* (2013.01); *G05B 2219/37388* (2013.01)

(58) Field of Classification Search
None
See application file for complete search history.

(56) References Cited

U.S. PATENT DOCUMENTS

| | | |
|---|---|---|
| 5,107,598 A | 4/1992 | Woznow et al. |
| 5,549,412 A | 8/1996 | Malone |

(Continued)

OTHER PUBLICATIONS

International Search Report and Written Opinion from the International Searching Authority, dated Aug. 22, 2019, 8 pages, for corresponding International Patent Application No. PCT/US19/28983.

*Primary Examiner* — Jennifer L Norton
(74) *Attorney, Agent, or Firm* — Polsinelli PC

(57) ABSTRACT

The disclosed technology relates to an intelligent motion control system that utilizes onboard sensors and processing to guide a surface manipulation machine along a path of travel on a surface, confirm a position of the machine with respect to the surface, and actuate a surface manipulation tool to achieve a desired surface profile or locate a point of interest. The system may include a first and second surface profiler that is configured to scan a surface on which the system travels and a positional sensor configured to generate positional data representing a position of the machine. The processor is configured to generate topography data based on output received from the first surface profiler, generate intermediate data based on output received from the second profiler, compare the intermediate data with the topography data to calculate an offset; and control motion of the system based on the offset.

20 Claims, 7 Drawing Sheets

(51) Int. Cl.
    *G05B 19/4093* (2006.01)
    *G05B 19/19* (2006.01)

(56) References Cited

U.S. PATENT DOCUMENTS

| | | | |
|---|---|---|---|
| 6,826,894 B2* | 12/2004 | Thiemann | A01D 41/141 |
| | | | 701/50 |
| 7,845,878 B1 | 12/2010 | Godbersen et al. | |
| 9,380,738 B2* | 7/2016 | Nelson, Jr. | G06F 11/30 |
| 2003/0069668 A1* | 4/2003 | Zurn | E01C 23/07 |
| | | | 700/245 |
| 2010/0215433 A1 | 8/2010 | Fritz | |
| 2012/0203428 A1 | 8/2012 | Choi et al. | |
| 2017/0086348 A1* | 3/2017 | Schleyer | A01B 61/00 |
| 2019/0008088 A1* | 1/2019 | Posselius | A01B 63/1112 |
| 2021/0216075 A1* | 7/2021 | Takaoka | E02F 9/265 |

* cited by examiner

INTELLIGENT MOTION CONTROL THROUGH SURFACE SCAN COMPARISON AND FEATURE RECOGNITION

CROSS-REFERENCE TO RELATED APPLICATION

The present application claims the priority benefit of U.S. patent application No. 62/662,687, filed Apr. 25, 2018, entitled "MOTION CONTROL AND FEEDBACK SYSTEMS TO FACILITATE PRECISION PAVING AND GRINDING," the disclosure of which is incorporated herein by reference.

TECHNICAL FIELD

The present disclosure relates generally to motion control of machines, and more particularly, to intelligent motion control through surface scan comparison and feature recognition.

BACKGROUND

Conventional motion control systems may utilize an "outside-in" tracking methodology that limits the operational range of such systems due to the necessary communication between stationary sensors and the moving equipment.

SUMMARY

The disclosed embodiments provide for an intelligent motion controlled machine that includes a first surface profiler disposed on a leading surface of a cart, the first surface profiler configured to scan a surface on which the cart travels. The machine also includes a second surface profiler disposed on an actuating tool, the second surface profiler configured to scan the surface. The machine further includes a positional sensor configured generate positional data representing a position of the cart. The machine also includes a processor configured to generate topography data based on output received from the first surface profiler and the positional sensor; generate intermediate data based on output received from the second profiler and the positional sensor; compare the intermediate data with the topography data to calculate an offset; and control motion of the cart based on the offset.

The disclosed embodiments provide for a system that includes one or more processors and at least one computer-readable storage medium having stored therein instructions which, when executed by the one or more processors, cause the system to: generate topography data of a surface based on output received from a first surface profiler and a positional sensor; generate intermediate data of the surface based on output received from a second profiler and the positional sensor; compare the intermediate data with the topography data to calculate an offset; and control motion of a cart traveling on the surface based on the offset, the cart having an actuating tool to manipulate the surface.

In some embodiments, a method for controlling motion of a machine is disclosed. The method includes generating topography data of a surface on which a machine travels based on output received from a first surface profiler and a positional sensor; generating intermediate data of the surface based on output received from a second profiler and the positional sensor, the second profiler disposed on an actuating tool of the machine; comparing the intermediate data with the topography data to calculate an offset; and controlling motion of the machine based on the offset.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Conventional motion control systems may utilize "outside-in" tracking methods requiring external sensors or systems that sense the location of a controlled object, thereby resulting in a limited operational range due to required communications with necessary surveying equipment. Accordingly, there is a need for an intelligent motion control system that is capable of utilizing on-board sensors to scan a surface and control movement or motion of a machine along a path of travel, confirm that movement of the machine along the path of travel is maintained through steering control of the machine, and ensure accurate placement of a surface manipulation tool that may be configured to either remove or add material from the surface, as desired, or locate a position in three-dimensional space for further assessment.

The disclosed technology addresses the foregoing limitations of conventional "outside-in" tracking systems utilized for motion control of certain machines, by utilizing an onboard scanning system to generate a substrate topography of a surface that is used to determine a location of a machine (e.g., milling, grinding, paving, slip forming, coring, surfacing, screeding, grading, surface manipulation machine, or any other equipment used in construction, manufacturing, or quality control) in three-dimensional space, control motion and/or guidance of the machine, and ensure accurate placement of a tool on the machine (e.g., grinding head, screed, mold, drill bit, coring bit, blade, straightedge, material extrusion head, material placement arm, or any other tool used in construction, manufacturing, transportation, or quality control) with respect to the surface.

Figure 1:
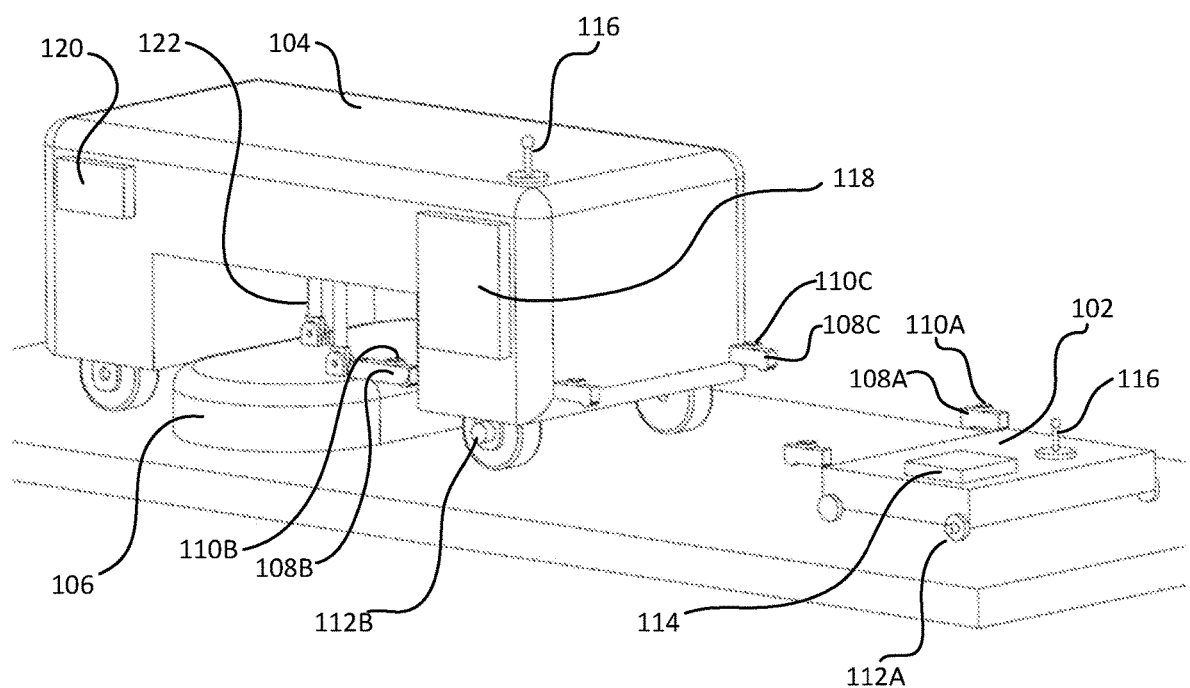
FIG. 1 illustrates a perspective view of an example intelligent motion control surface manipulation system, in accordance with various aspects of the subject technology.

FIG. 1 illustrates a perspective view of an example intelligent motion control surface manipulation system 100, in accordance with various aspects of the subject technology. In one example, the intelligent motion control surface manipulation system 100 may be a machine comprising a lead cart 102 and a motion-controlled manipulation cart 104. The manipulation cart 104 may be configured to receive data from the lead cart 102 through a wired or wireless connection.

The lead cart 102 may enable separation of leading (e.g., surface profiler 108A) and trailing sensing instruments (e.g., surface profiler 108B) that are configured to measure properties of a surface to be manipulated, to thereby improve response capabilities of the surface manipulation system 100 due to the increased distance between the leading and trailing sensors. Increasing a distance between the leading and trailing sensors results in an increased duration of time between the time when the leading sensor senses a feature of the surface (e.g., ridge, point of interest, starting point, etc.) to when the trailing sensor reaches the feature. By increasing the duration of time, the system 100 is provided with sufficient time to adjust a surface manipulation tool to, for example, generate a desired surface profile for the surface and if required, to adjust a position of a surface manipulation tool (e.g., actuating tool 106) to address the feature by, for example, performing a grinding operation on a ridge. In the example shown in FIG. 1, the lead cart 102 may be configured to initially scan the entire surface and output a topographic map that allows a user to thereafter view a best-fit surface, modify the best-fit surface as desired, or alternatively design any surface as desired, as described further below with reference to FIG. 5.

The lead cart 102 may comprise one or more surface profilers 108A, one or more Inertial Measurement Units, or IMU, 110A, one or more positional sensors 112A, a processor 114, and a GPS module 116. Each of the lead cart 102 sensors (e.g., surface profiler 108A, IMU 110A, positional sensor 112A, and GPS module 116) may be communicatively coupled to the processor 114. The surface profiler 108A may be disposed on the lead cart and is configured to scan a surface on which the lead cart travels. The surface profiler 108A provides data representing a topography of the surface to the processor 114 for processing. The IMU 110A may be configured to measure acceleration of the lead cart 102 and may be mounted proximal to the surface profiler 108A to enable filtering of data provided by the surface profiler 108A to remove extraneous motion of the surface profiler 108A caused by the lead cart 102 as it travels along uneven features of the surface. IMU 110A may also be configured to provide inertial navigation data to track the movement of the lead cart 102. It should be noted that the IMU may be substituted for an accelerometer, or gyroscope, depending on the information needed.

The positional sensor 112A may be mounted proximal to a wheel of the lead cart 102 to provide positional data (e.g., longitudinal displacement data) representing a position of the lead cart 102 along the path of travel. A gear or pulley system may be used between the wheel and sensor to adjust resolution of the positional sensor 112A, as desired to match a sampling rate of the other sensors (e.g., surface profiler 108A, IMU 110A) or vice versa. The data from the positional sensor 112A may be used to tag the data provided by the surface profiler 108A, IMU 110A, and GPS module 116. The data from the surface profiler 108A, filtered with data from the IMU 110A, is tagged with longitudinal data from the positional sensor 112A and is used to generate the topographic model of the surface. The processor 114 may be configured to log incoming data from the surface profiler 108A, IMU 110A, positional sensor 112A, and GPS module 116 and compile the data into packets before transmitting the data to the manipulation cart 104. Transmission of the data may be performed continuously. It should be noted that the transmission of data between the lead cart 102 and the manipulation cart 104 may be performed through wired or wireless means. The GPS module 116 may be used to provide absolute coordinates, as desired.

The manipulation cart 104 is configured to accurately and intelligently adjust a position of a tool to manipulate the surface, such as to add or remove material to or from the surface (e.g., milling, grinding, paving, slip forming, coring, surfacing, screeding, grading, surface manipulation machine, or any other equipment used in construction, manufacturing, or quality control). The manipulation cart 104 may comprise one or more surface profilers 108B and one or more IMUs 110B mounted to an actuating tool 106. The manipulation cart 104 also comprises one or more positional sensors 112B, and a GPS module 116. Each of the manipulation cart 104 sensors (e.g., surface profiler 108B, IMU 110B, positional sensor 112B, and GPS module 116) may be communicatively coupled to a guidance module 118 having one or more processors. The surface profiler 108B may be disposed on the independently actuating tool 106 and is configured to scan the surface proximal to the actuating tool 106. The surface profiler 108B provides data representing a topography of the surface to the guidance module 118 for processing. The surface profiler 108B mounted on the manipulation cart 104 provides secondary data to the guidance module 118 to assist with steering of the manipulation cart 104. In one aspect, the surface profiler 108A of the lead cart 102 is disposed in front of, or on a leading surface, compared to the surface profiler 108B of the manipulation cart 104. The guidance module 118 may also be configured to log incoming data from the surface profiler 108B, IMUs 110B, positional sensors 112B, GPS module 116, and all other incoming data from lead cart 102 and compile the data onto internal memory.

The guidance module 118 is also configured to convert data representing the desired finished surface profile to machine code (as described in FIG. 3) that may then be used to guide the manipulation cart 104 as it traverses a path. In operation, as the manipulation cart 104 traverses the path, the surface profiler 108B provides new data to the guidance module 118 where the new data is compared against the machine code representing the desired finished surface profile using the corresponding longitudinal displacement data provided by the positional sensors 112B.

The manipulation cart 104 also comprises an actuating tool 106 that is configured to manipulate a surface, as desired. For example, the actuating tool 106 may be a slipform paving mold, grinding head for removing material (e.g., concrete, asphalt, or organic materials), grading shovel, screed, milling bit, drilling bit, coring bit, blade, straightedge, material extrusion head, material placement arm, or any object intended for fine surface modification, manipulation, observation or quality control. The actuating tool 106 is mechanically actuated by one or more actuators 122 and controlled by an actuation control module 120 having one or more processors. The actuators 122 may each comprise a mechanical actuator, such as a linear actuator or rotary actuator, hydraulic cylinder, pneumatic cylinder, or other actuators as may be known by those of ordinary skill.

In one aspect, the guidance module 118 is in communication with the actuation control module 120. The actuation control module 120 is configured to control actuation of the actuator 122 to adjust a position of the actuating tool 106 with respect to a substrate. In one aspect, the actuator 122 is configured to vertically move the actuating tool 106. In other aspects, the actuator 122 may be configured to adjust an angle of the actuating tool 106. The IMU 110B may be mounted to the actuating tool 106 to measure an acceleration or orientation of the actuating tool 106. The IMU 110B may provide data to the actuation control module 120 regarding a position (e.g., tilt, pitch, roll, yaw) of the actuating tool 106 to enable the actuation control module 120 to control the actuator 122 to level, position, or adjust a position of the actuating tool 106, as desired. In another aspect, the data from the IMU 110B may be used by the actuation control module 120 to adjust or maintain a position of the actuating tool 106 at a desired angle or elevation with respect to manipulation cart 104 regardless of a position or orientation of the manipulation cart 104.

Data from the surface profiler 108B may be synced and tagged with longitudinal position data from the positional sensor 112B and sent to the guidance module 118 for comparison with the initial scan data captured by the lead cart 102 using the longitudinal data from the initial scan to determine the location of the actuating tool 106 in relation to the existing surface. Data from the surface profiler 108B may also be communicated to the actuation control module 120 to aid in controlling a lateral position of the actuating tool 106.

In another aspect, the manipulation cart 104 may comprise an independently adjustable suspension (e.g., airbags) at each wheel that enables the actuating tool 106 to be vertically raised or lowered, along with a height of the manipulation cart 104. In other aspects, the actuating tool 106 may be raised or lowered at one or more corners of the manipulation cart 104 via the adjustable suspension to adjust a pitch, roll, and yaw of the actuating tool 106. Data from the lead cart 102 relating to a surface profile of the substrate collected by the surface profiler 108A may be transmitted to the guidance module 118 of the manipulation cart 104 and used to adjust an elevation, pitch, roll, and/or yaw of the manipulation cart 104 by actuating the suspension.

In another example, the manipulation cart 104 of the intelligent motion control surface manipulation system 100 may comprise additional sensors disposed on a leading surface of the manipulation cart 104 to eliminate the lead cart 102. In this example, the intelligent motion control surface manipulation system 100 may operate in a continuous operation, i.e. leading surface data is captured at the same time as the trailing surface data with a set distance between them. All topographic data provided by the trailing sensors (e.g., surface profilers 108B) will be compared with leading topographical data captured by leading sensors (e.g., surface profilers 108C) based on longitudinal coordinates. For example, a leading surface profiler 108C and leading IMU 110C may be mounted to a leading surface of the manipulation cart 104 that is in front of a location where the trailing sensors are located. The leading surface profiler 108C and the leading IMU 110C may be paired with the positional sensor 112B to generate filtered surface data (e.g., topography data) relative to a defined starting point (e.g., a machine starting position).

In this example, the leading surface profiler 108C and the leading IMU 110C provide their respective outputs to the guidance module 118 for processing. The leading IMU 110C may be disposed proximal to the leading surface profiler 108C and is configured to measure an acceleration of the manipulation cart. The guidance module 118 may be configured to filter the output received from the leading surface profiler 108C using output received from the leading IMU 110C to remove extraneous motion of the leading surface profiler 108C caused by the manipulation cart 104 as it travels along uneven features of the surface. The guidance module 118 may then tag the filtered data with a longitudinal position provided by the positional sensor 112B to generate topography data (or leading surface data) representing a surface topography of the surface on which the manipulation cart 104 travels. The topography data is stored in memory of the guidance module 118 for later comparison.

As the manipulation cart 104 travels along its path on the surface, the trailing surface profiler 108B provides data representing the surface to the guidance module 118. The data provided by the trailing surface profiler 108B may not be filtered with the data from the trailing IMU 110B, and is instead tagged with longitudinal position data from the positional sensor 112B to generate intermediate data (or trailing surface data). The intermediate data (or trailing surface data) is compared with the topography data (or leading surface data) by the guidance module 118 based on a corresponding longitude to determine if there is an offset between the data sets. For example, if there is an offset between the intermediate data (or trailing surface data) and the topography data (or leading surface data), then the guidance module 118 sends command signals to control steering of the manipulation cart 104 to eliminate the offset and thereby ensure that the manipulation cart 104 is traveling on the desired path without deviation. Data from the IMU 110B may be used to determine the pitch, roll, and yaw of the actuating tool 106, as described above, to optimize a tool position based on the desired operation.

Figure 2:
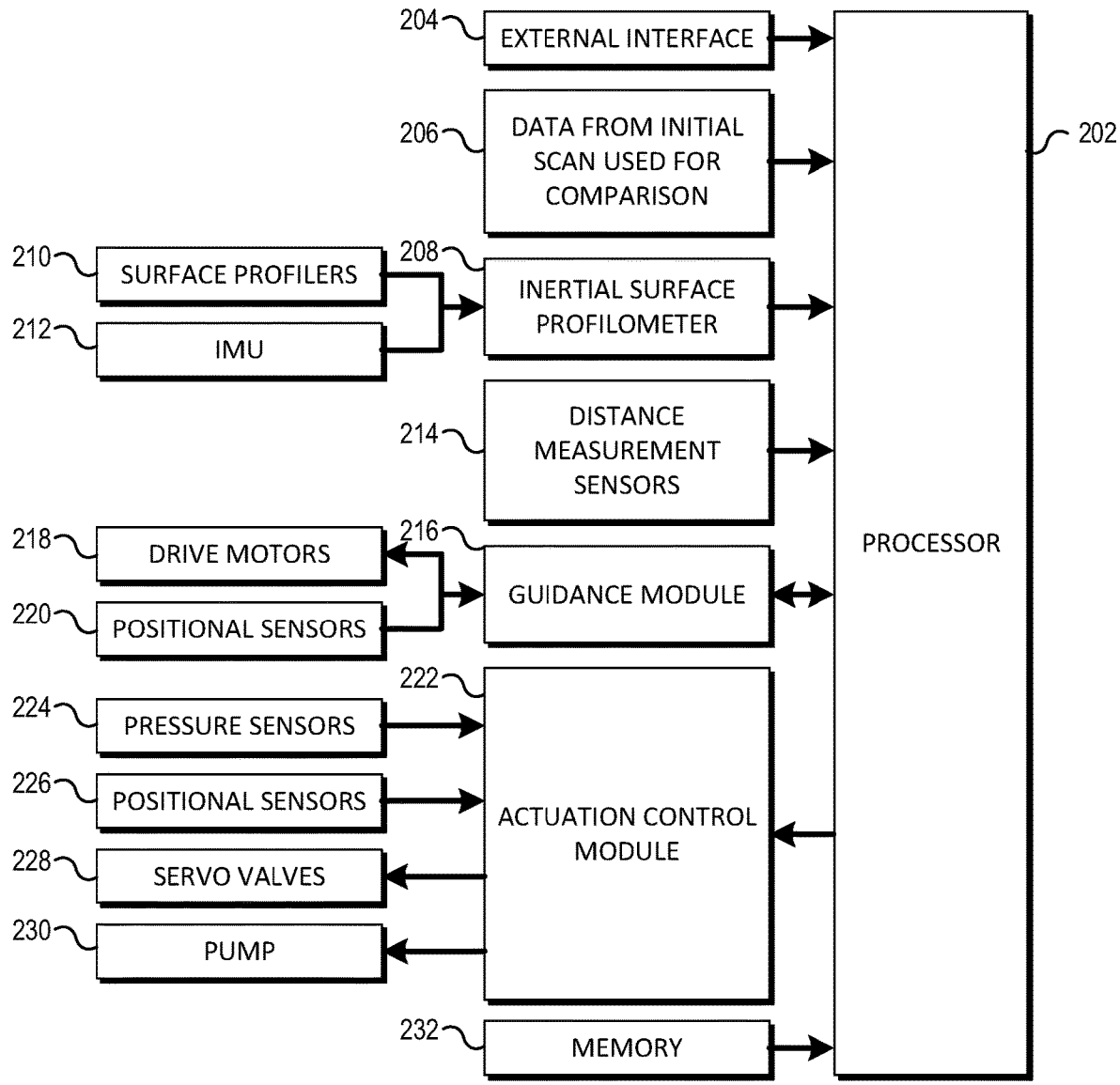
FIG. 2 illustrates a block diagram of an intelligent motion control system, in accordance with various aspects of the subject technology.

FIG. 2 illustrates a block diagram of an intelligent motion control system 200, in accordance with various aspects of the subject technology. The system 200 includes multiple components communicating with a main processing unit 202. The components may include an external interface or operator's computer 204, data from an initial scan 206 which may comprise a 3D array of positional coordinates (e.g., X, Y, Z array of points) that represents an existing surface, an inertial surface profilometer 208 located on an actuating tool (e.g., actuating tool 106 of FIG. 1), a guidance module 216 (guidance module 118 of FIG. 1) that is configured to guide a surface manipulation machine along a path, an actuation control module 222 (e.g., actuation control module 120 of FIG. 1) that is configured to actuate the actuating tool (e.g., actuating tool 106 of FIG. 1), and built-in memory 232.

In one aspect, the system 200 may further comprise a plurality of distance measurement sensors 214 arranged on the surface manipulation machine (e.g., surface manipulation machine 100 of FIG. 1) to sense the distance of the surface manipulation machine to the surroundings when operating in enclosed areas, such as tunnels and Very Narrow Aisles (VNAs). The plurality of distance measurement sensors 214 may provide data representing distance to the processor 202 to enable the guidance module 216 to maintain the surface manipulation machine between walls of a tunnel or sides of an enclosed area. In one example, plurality of distance measurement sensors 214 may comprise two or more sensors arranged on each side of the surface manipulation machine facing laterally outward to detect external surfaces along the sides of the surface manipulation machine. When utilized in a tunnel, for example, the plurality of distance measurement sensors 214 detect walls of the tunnel to center the surface manipulation machine as it travels down the tunnel. When utilized in a VNA, the plurality of distance measurement sensors 214 detect racking system of the VNA to center the surface manipulation machine and avoid collisions with sensitive shelving.

In one aspect, the inertial surface profilometer 208 may comprise one or more surface profilers 210 and one or more IMUs 212 that are configured to generate data representing the topography of the surface. Specifically, each of the profilers 210 are configured to measure a two-dimensional profile of the surface on which the surface manipulation machine travels. The measured surface may be at or proximal to a tire track of the surface manipulation machine or outside of the tire track. For example, the surface profiler 210 may be a laser line profiler mounted in a manner such that the laser line is perpendicular to the path of travel of the surface manipulation machine. In this arrangement the surface profiler 210 would capture a cross-sectional profile each time the positional sensor 220 is triggered by the processor 202. In one aspect, the processor 202 may request data to be collected incrementally or continuously. Each IMU 212 is configured to filter extraneous motion of the surface profiler 210 caused by the surface manipulation machine traveling over an existing surface and to provide inertial navigation data to the processor 202 to determine movement of the actuating tool.

In another aspect, the guidance module 216 may comprise one or more drive motors 218 and one or more positional sensors 220. The drive motors 218 drive wheels of the surface manipulation machine through conventional means, such as through direct or indirect coupling of rotary motors to wheels. The positional sensors 220 are configured to provide longitudinal displacement data of the surface manipulation machine (e.g., manipulation cart 104 of FIG. 1) along the path of travel. The positional sensors 220 may comprise one or more rotary encoders that are used by the processor 202 to request data from the surface profilers 210, IMUs 212, and the distance measurement sensors 214 to ensure that all data generated by the surface profilers 210, IMUs 212, and the distance measurement sensors 214 have a matching timestamp. The processor 202 is configured to use the data from the surface profilers 210, IMUs 212, and the distance measurement sensors 214 to create a topographic model of the surface.

In some aspects, the actuation control module 222 is configured to actuate the actuating tool and may comprise one or more pressure sensors 224, one or more positional sensors 226, one or more servo valves 228, and a hydraulic pump 230. The pressure sensors 224 are configured to monitor pressures in the hydraulic systems at different points depending on the level of monitoring desired. These locations include but are not limited to hydraulic cylinders, an inlet and outlet of a pump, and at servo valves. Monitoring the pressure in hydraulic systems is critical when automating control to minimize the chance of damaging any of the system's components due to overexertion. The positional sensors 226 are configured to monitor the extension of one or more hydraulic cylinders. The movement of each cylinder can be used to better filter the data from the IMU, which in turn reduces drift associated with inertial tracking systems. The servo valves 228 are configured to control individual hydraulic cylinders or motors with a high level of precision based on signals sent from the actuation control module 222. The hydraulic pump 230 is configured to pressurize the hydraulic system, as required.

In operation, data from the initial scan 206 (e.g., X, Y, Z array of points) is provided to the processor 202 representing topography data of a surface along a path. The surface manipulation machine thereafter commences travel along the path. During travel, the inertial surface profilometer 208 collects data from the surface profilers 210 and IMUs 212. The surface profilers 210 provide data in an array of Y (transverse) and Z (height) points to the processor 202. The IMUs 212 provide acceleration and angular position data in the form of ax, ay, az, gx, gy, and gz to the processor 202 representing linear displacements and changes in pitch, roll, and yaw of the actuating tool (e.g., actuating tool 106 of FIG. 1). The positional sensors 220 of the guidance module 216 provide a vehicle position along an X axis (along the direction of travel) to the processor 202.

The processor 202 combines the data from the positional sensors 220 with data from the surface profilers 210 to generate a 3D array (e.g., X, Y and Z array) that represents a position of the actuating tool (e.g., actuating tool 106 of FIG. 1) as the surface manipulation machine (e.g., surface manipulation machine 100 of FIG. 1) traverses the path. In one aspect, the 3D array representing the position of the actuating tool is synced with data from the initial scan 206 by using a common starting point "X1" (e.g., start point on path) to facilitate comparison of the data as the surface manipulation machine traverses the path. It should be noted that the common starting point can be any type of distinct geometrical shape or feature that the system can identify from the incoming surface profiling data through known features, this includes but is not limited to stamped number plates. As the surface manipulation machine traverses the path, the X coordinate is used to enable the processor 202 to sync a position of the actuating tool with the initial scan data in real-time.

The processor 202 may control the speed of the surface manipulation machine as the machine traverses the path by sending commands to the guidance module 216, which then controls the speed of the drive motors 218 based on the received commands. In another aspect, as the surface manipulation machine traverses the path, the processor 202 continuously collects data from the surface profilers 210 and the IMU 212 to determine whether a current position of the actuating tool is in the required position and orientation to achieve the desired finished surface profile. For example, if the processor 202 determines that the actuating tool must be lowered by 0.25 inches, the processor 202 sends a command to the actuation control module 222 to lower a position of the actuating tool. In response, the actuation control module 222 actuates the hydraulic cylinder by controlling servo valves 228 and the hydraulic pump 230. The actuation control module 222 also receives data from the pressure sensors 224 and positional sensors 226 to ensure that the desired position for the actuating tool is obtained and maintained.

Figure 3:
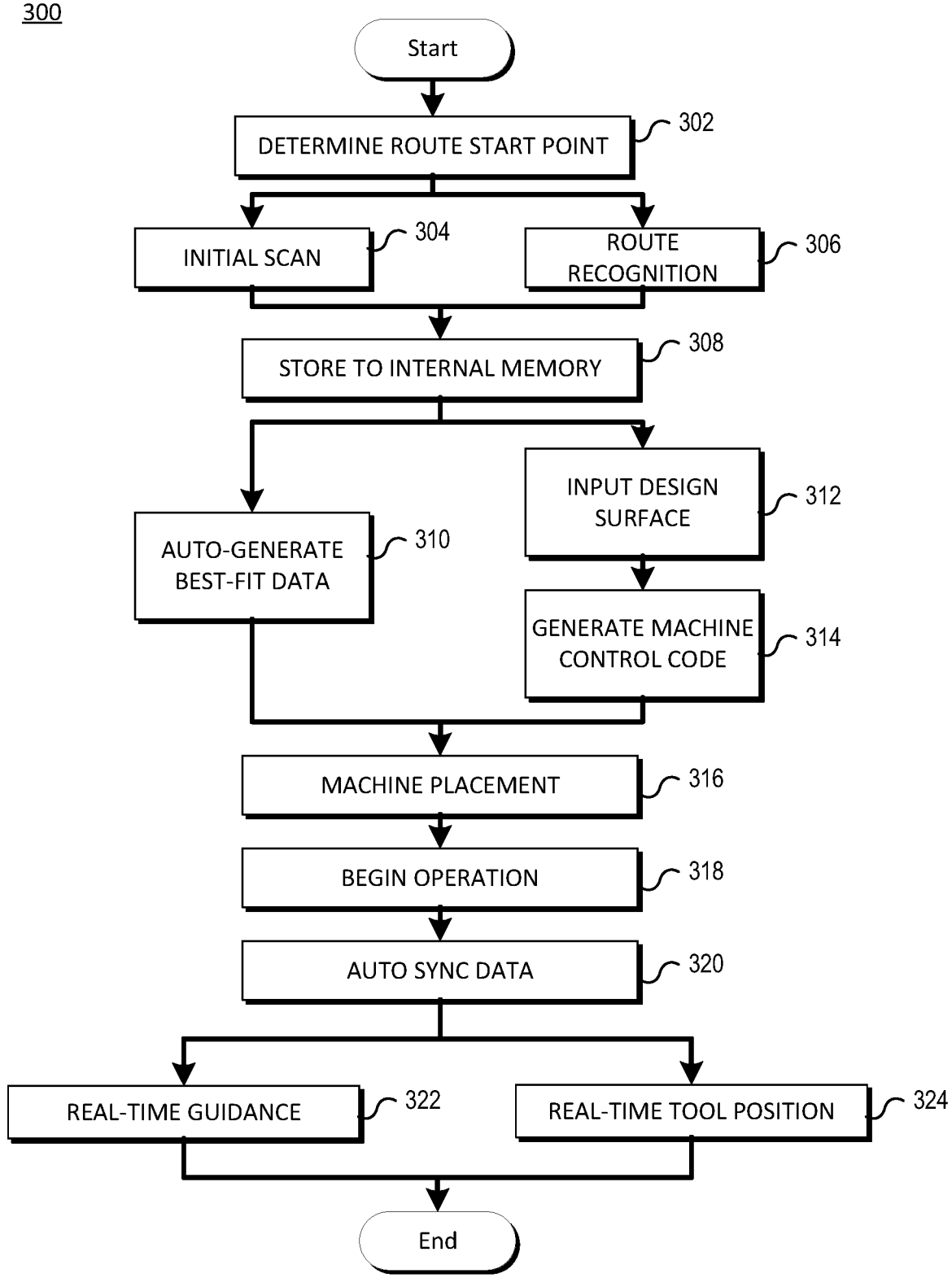
FIG. 3 illustrates an example process for an intelligent motion control system, in accordance with various aspects of the subject technology.

FIG. 3 illustrates an example process 300 for an intelligent motion control system, in accordance with various aspects of the subject technology. It should be understood that, for any process discussed herein, there can be additional, fewer, or alternative steps performed in similar or alternative orders, or in parallel, within the scope of the various aspects unless otherwise stated. The process 300 can be performed by an intelligent motion control surface manipulation system (e.g., the system 100 of FIG. 1) or similar system.

In some implementations, process 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 300 in response to instructions stored electronically on an electronic storage medium. The one or more processing devices may include one or more devices configured through hardware, firmware, and/or software to be specifically designed for execution of one or more of the operations of process 300.

In step 302, an operator will determine a job starting point to begin an initial scan of an existing surface through use of a machine, such as the lead cart 102 of FIG. 1. In step 304, an initial scan is completed along a path to generate a 3D array or topography data of the existing surface. In step 306, a route recognition is completed to gather detailed information regarding length of straights, slope breaks, and turns along the path. In step 308, the collected data is saved in memory to be used to either automatically generate a best-fit surface as discussed with reference to step 310 or to generate modified data representing a finished surface profile as discussed with reference to step 312.

In step 310, the 3D array or topographic map is processed to generate best-fit data. For example, the 3D array or topography data from the initial scan of step 304 may be processed to generate best fit data based on the specific need of each job or industry. The best fit data may be generated based on one or more of the following criteria: minimal material removal, 25 ft straightedge, International Roughness Index improvement (either percentage based or to meet a minimal IRI), Fmin standard, or other relevant standards that may be applicable in defining levelness, flatness, smoothness, or other trait or characteristic of a surface.

In step 312, the 3D array or topographic map data may be reviewed by an operator and modified to generate data representing a finished surface profile having an ultra-smooth or ultra-flat profile (e.g., $F_F$ rating of 100-150), a true level profile (e.g., as may be required for a manufacturing floor, airport runway, etc.), a specific slope-break profile, or a complex contour profile as may be desired to achieve a particular job requirement. The operator can also review the topographic map to identify areas of interest for other operations (e.g. drill, cut, insert anchors, quality check, etc.) according to the particular job requirements.

In step 314, the modified data may be converted to machine control code that may be used to guide a surface manipulation machine along the path from the starting point of step 302 and through the route of step 306. In step 316, the surface manipulation machine (e.g., manipulation cart 104) may be placed at the starting point of step 302. For example, the starting point may comprise a feature on the surface, such as a geometrical shape on the surface or a stamped plate on the surface. The surface manipulation machine may be configured to identify the starting point on the surface by first identifying the feature in the topography data captured in the initial scan and subsequently, identifying the same feature in a later, intermediate scan, whereby the surface manipulation machine will begin operation of the machine and traversal of the machine along the path when the machine determines it is at the starting point.

In step 318, the surface manipulation machine begins operation to create the finished surface profile. Once the machine starts, in step 320, new incoming data (or intermediate data) collected by the sensors (e.g., surface profilers 108B of FIG. 1) is automatically synced with the topography data of step 304 using position data as an index and compared against the best fit data of step 310 or the modified data of step 312 to provide real-time guidance. In step 322, the new incoming data (or intermediate data) is compared to the best fit data from step 310 or modified data of step 312 to provide real-time guidance. For example, if there is a discrepancy or an offset between the intermediate data of step 320 and the best fit data from step 310 or modified data of step 312, such as data points on either side not matching, the controller can align the data based on known features and calculate the centerline offset to determine if the equipment's navigation is going off course. If an offset is calculated, the surface manipulation machine may be configured to control or adjust steering of the surface manipulation machine to ensure that the machine is traveling on-course.

In step 324, real-time validation of a position (e.g., elevation, pitch, roll) of an actuating tool of the surface manipulation machine (e.g., actuating tool 106 of FIG. 1) is performed using data from trailing sensors, such as the trailing IMU 110B of FIG. 1. In one aspect, the surface manipulation machine is configured to adjust a position of the actuating tool based on output received from the trailing IMU.

Figure 4:
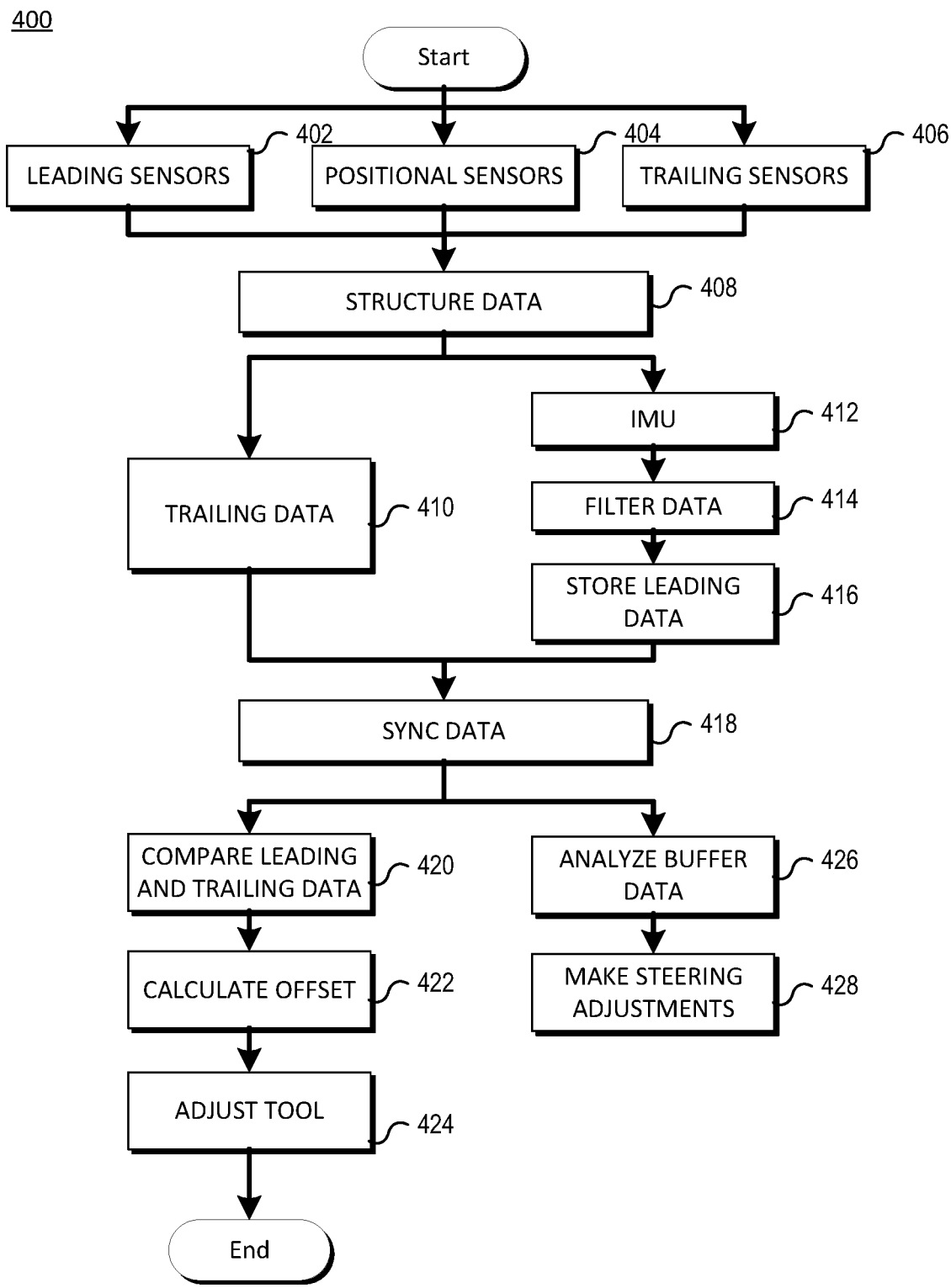
FIG. 4 illustrates an example process for an intelligent motion control system in continuous operation, in accordance with various aspects of the subject technology

FIG. 4 illustrates an example process 400 for an intelligent motion control system in continuous operation, in accordance with various aspects of the subject technology. It should be understood that, for any process discussed herein, there can be additional, fewer, or alternative steps performed in similar or alternative orders, or in parallel, within the scope of the various aspects unless otherwise stated. The process 400 can be performed by an intelligent motion control surface manipulation system (e.g., the system 100 of FIG. 1) or similar system.

In some implementations, process 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 400 in response to instructions stored electronically on an electronic storage medium. The one or more processing devices may include one or more devices configured through hardware, firmware, and/or software to be specifically designed for execution of one or more of the operations of process 400.

In step 402, data from leading sensors (e.g., surface profilers 108C of FIG. 1) are collected. The leading sensors may include a surface profiler, IMU, a positional sensor, and when desired, a GPS module for absolute positioning. As described above, the data provided by the surface profiler is filtered with data provided by the IMU to remove any extraneous motion caused by uneven surfaces traversed by a surface manipulation machine that is not representative of the actual topography of the surface. Data from the positional sensor may be used to index data provided by the surface profiler and the IMU based on a position of the surface manipulation machine. The filtered and indexed data may be used to create an initial topographic map of the existing surface (e.g., topographic data). The IMU data may also be used to create a record of the surface manipulation machine's pitch, roll, and yaw during operation.

In step 404, data from the positional sensor is collected. The positional sensor may, for example, comprise a rotary encoder that provides data representing a longitudinal displacement of the surface manipulation machine. In one embodiment, a rotary encoder may be attached to the wheel, or track system, that is calibrated to measure the displacement and speed to a high accuracy.

In step 406, data from trailing sensors (e.g., surface profilers 108B of FIG. 1) is collected. The trailing sensors may include a surface profiler, IMU, and a positional sensor that generate data that is used to create a 3D topographical map that is used to control motion of the machine and position of the actuating tool (e.g. actuating tool 106 of FIG. 1). The 3D topographical map is generated using the surface profiler data as well as the longitudinal displacement data from the positional sensor. A distance between the trailing sensors and the leading sensors determines how much data from the leading sensors the best fit model can use to generate the new surface, as described above. In some industries that distance can be standardized, such as road paving where the smoothness is determined over a specified interval.

In step 408, the collected data from the leading sensors and trailing sensors is structured and aligned. The data is structured into a matrix with individual columns representing sensor readings and rows representing incremental movements, or readings, from the positional sensor. The data is aligned with the data from the positional sensor, which triggers the other sensors to capture data to ensure all data received from the sensors has a matching timestamp.

In step 410, trailing data collected by the trailing sensors is passed through without any filtering with the IMU data. The IMU data provides the accelerations of the equipment in different positions to determine the inertial movement of the machine as it travels over rough surfaces as well as additional gyroscopic motion. The incoming data from the IMU includes but is not limited to accelerations in the x, y and z directions, as well as pitch, roll, and yaw for the equipment. In step 412 and 414, IMU data is used to filter leading data collected from the leading sensors to remove motion caused by irregularities in the existing surface. In step 416, leading filtered data is stored in machine memory.

In step 418, the trailing data and the filtered leading data is synced using an X coordinate. The synced data is then used in two ways, for guidance of a surface manipulation machine (e.g., manipulation cart 104 of FIG. 1) and actuation control of an actuating tool (e.g., actuating tool 106) mounted to the machine. For guidance, in step 426, each of the filtered and trailing data sets are analyzed to identify a starting point to enable accurate placement of the surface manipulation machine. Any difference between the filtered and trailing data sets can be used to compute an angular offset and to generate corrective commands in step 428 to steer the surface manipulation machine.

For actuation control, in step 420, the filtered and trailing data is compared and in step 422, aligned based on a calculated offset to determine vertical height differences. For actuation control, in step 420, data from the trailing sensors is compared to the filter data from the leading sensors. Step 422 calculates the difference of each value to determine any offsets. If an offset is calculated, step 424 communicates with the actuator to make the necessary adjustment to bring the actuating tool into position. The offset can be in the form of vertical changes in the position of the actuating tool, or rotations of the tool.

Figure 5:
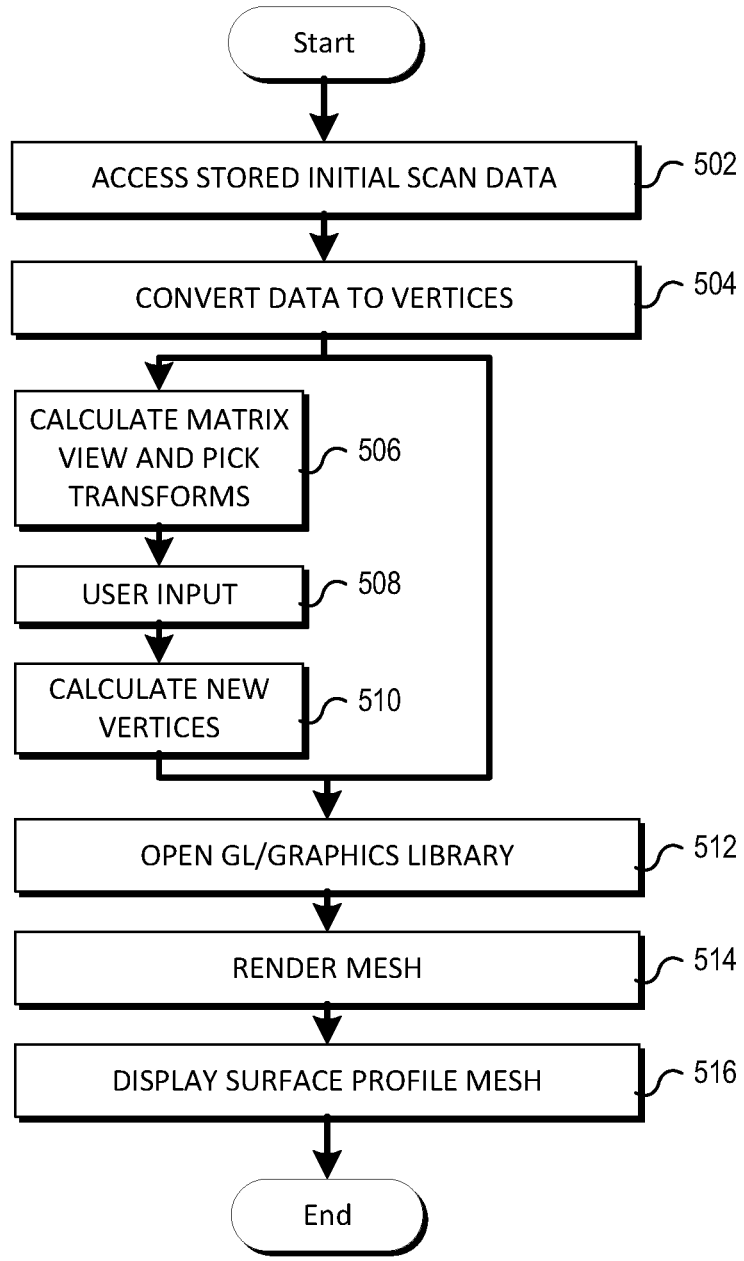
FIG. 5 illustrates an example process for modifying a surface profile, in accordance with various aspects of the subject technology.

FIG. 5 illustrates an example process 500 for modifying a surface profile, in accordance with various aspects of the subject technology. It should be understood that, for any process discussed herein, there can be additional, fewer, or alternative steps performed in similar or alternative orders, or in parallel, within the scope of the various aspects unless otherwise stated. The process 500 can be performed by an intelligent motion control surface manipulation system (e.g., the system 100 of FIG. 1) or similar system.

In some implementations, process 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 500 in response to instructions stored electronically on an electronic storage medium. The one or more processing devices may include one or more devices configured through hardware, firmware, and/or software to be specifically designed for execution of one or more of the operations of process 500.

In step 502, the system accesses the initial scan data that is stored on the machine. In step 504, the data, which comes in the form of a 3D array of positional data, but could be any data that allows for the formation of a 3D surface, is converted to a series of vertices. In step 506, the system uses the series of vertices to form a surface mesh, whether triangular or quadrilateral. It should be noted that the surface mesh may be formed into any type of shape. If the surface is going to be modified, in step 508, the mesh may be displayed to allow visualization of the mesh on a screen and enable manipulation, as needed. A user may choose to inspect or modify the surface as desired. In step 510, the new surface data is converted to a new set of vertices. In step 512, a graphics library may be accessed to develop a new mesh. In step 514, after the data has been passed through the graphics library, the mesh may be rendered. In step 516, the mesh may thereafter be displayed to a user on a display or screen for confirmation. Once the surface is confirmed, the surface data may be stored in memory of the machine and used for surface comparison and motion control, as described above. If the surface is not confirmed, the process 500 may be repeated until the correct surface profile is designed and confirmed.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Figure 6A:
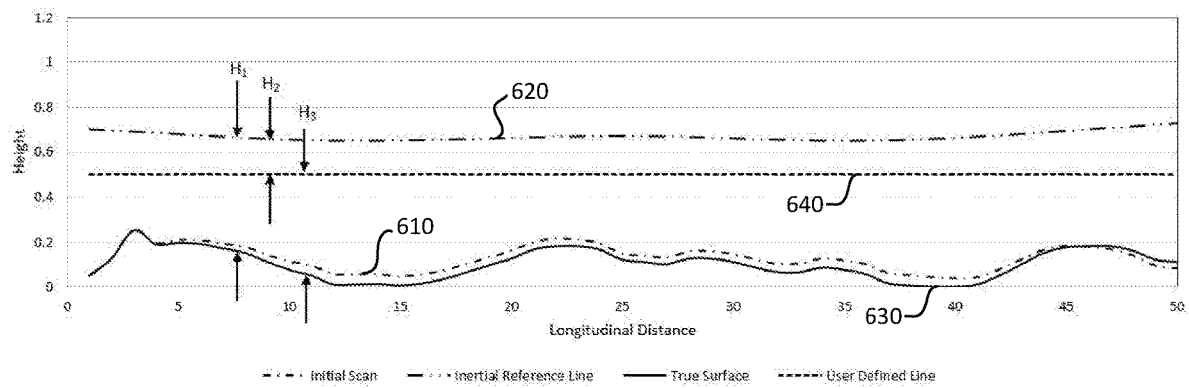
FIG. 6A illustrates an example of leading inertial surface profile data captured by a leading profiler, in accordance with various aspects of the subject technology

FIG. 6A illustrates an example of leading inertial surface profile data captured by a leading profiler, in accordance with various aspects of the subject technology. An initial surface profile 610 is first measured from an inertial reference line 620 by removing positional translations caused by machine motion, calculated from the IMUs, as it travels on a rough surface. The inertial reference line 620 is made by monitoring pitch and roll, (e.g., measured from either IMUs or tilt sensors), of the machine as it traverses the surface. A true surface 630 is calculated by adding the inertial reference line fluctuations to the initial surface profile 610. Subsequently, a preferred profile line 640 can be designed/defined, against the true surface profile 630 that fits specific desired criteria. It should be noted that any design surface can be made in relation to the true surface 630 and that algorithms can also be formed to automatically form control lines against the true surface profile 630. This process also applies to 3D topographical surface maps formed from the surface profilers to make control surfaces that guide the actuating tool along a specified path. In FIG. 6A, H1 represents a distance between the true surface 630 and the inertial reference line 620. H2 represents a distance between the user defined line 640 and the inertial reference line 620. H3 represents the difference between H1 and H2 and may be represented by the following equation:

$$H_{3_{(x_i)}} = H_{1_{(x_i)}} - H_{2_{(x_i)}}$$

Where the array of $$H_{3_{(x_i)}}$$

for i→n along longitudinal distance n forms the object control code. The machine control code may be stored in place of the initial scan on the vehicle's onboard memory.

Figure 6B:
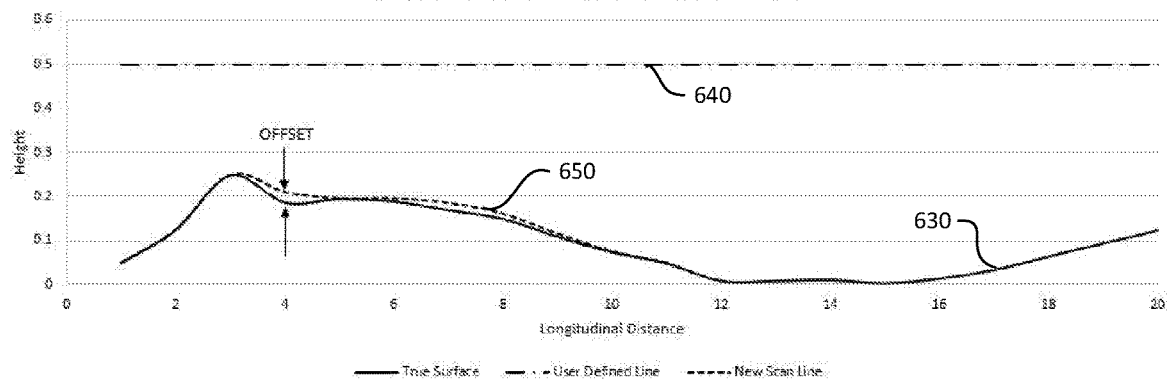
FIG. 6B illustrates an example of trailing inertial surface profile data captured by a trailing profiler, in accordance with various aspects of the subject technology.

FIG. 6B illustrates an example of trailing inertial surface profile data captured by a trailing profiler, in accordance with various aspects of the subject technology. The initial scan or user defined line 640 is used as the base for measurement comparison and the new scan data 650 is overlaid. When the machine begins to lift, which in turn lifts the actuating tool, the new scan 650 will begin to rise above the true surface 630, creating an offset, as indicated in FIG. 6B. When the offset is detected, the actuation control module (e.g., actuation control module 222 of FIG. 2) adjusts the appropriate cylinder to bring the corresponding surface of the actuating tool back into the appropriate alignment. This operation is continuously performed to guarantee that the actuating tool follows the user defined line 640, or inertial reference (best-fit) line, as the machine travels longitudinally along the surface In actuating the actuating tool (e.g. actuation tool 106 of FIG. 1), an offset may be calculated using the following equation:

$$\text{Offset}_{(x_i)} = \Delta_{(x_i)} = (\text{New Scan Line})_{(x_i)} - (\text{True Surface})_{(x_i)}$$

Where Offset$_{(x_i)}$ for all i→n along longitudinal distance n are fed back into the control loop in real-time to actuate the actuating tool (e.g. actuation tool 106 of FIG. 1) along the user defined line 640.

Figure 7:
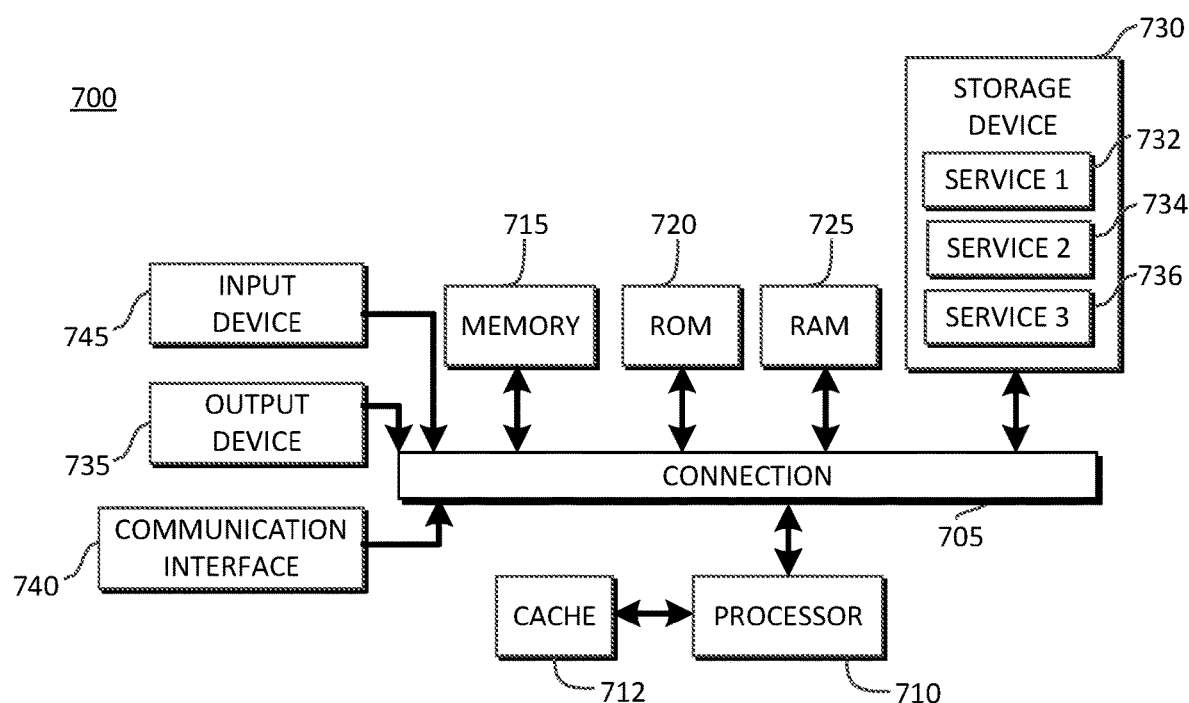
FIG. 7 illustrates an example of a system that may be used in an intelligent motion control system, in accordance with some aspects of the subject technology.

FIG. 7 illustrates an example of a system 700 that may be used in an intelligent motion control surface manipulation system, in accordance with some aspects of the subject technology. The components of the system 700 are in communication with each other using connection 705. Connection 705 can be a physical connection via a bus, or a direct connection into processor 710, such as in a chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

System 700 includes at least one processing unit (CPU or processor) 710 and connection 705 that couples various system components including system memory 715, such as read only memory (ROM) 720 and random access memory (RAM) 725 to processor 710. Computing system 700 can include a cache 712 of high-speed memory connected directly with, in close proximity to, or integrated as part of processor 710.

Processor 710 can include any general-purpose processor and a hardware service or software service, such as services 732, 734, and 736 stored in storage device 730, configured to control processor 910 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

It will be appreciated that computing system 700 can have more than one processor 710, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

As used herein, the term "module" may refer to any component or set of components that perform the functionality attributed to the module. This may include one or more physical processors during execution of processor readable instructions, the processor readable instructions, circuitry, hardware, storage media, or any other components.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. An intelligent motion controlled machine, comprising:
   a first surface profiler disposed on a leading surface of a cart, the first surface profiler configured to scan a surface on which the cart travels;
   a second surface profiler disposed on an actuating tool, the second surface profiler configured to scan the surface;
   a positional sensor configured to generate positional data representing a position of the cart;
   a processor configured to:
     generate topography data based on output received from the first surface profiler and the positional sensor;
     generate intermediate data based on output received from the second profiler and the positional sensor;
     compare the intermediate data with the topography data to calculate an offset; and
     control motion of the cart based on the offset.

2. The machine of claim 1, wherein the processor is further configured to:
   generate best-fit data based on the topography data; and
   compare the intermediate data with the best-fit data to steer the cart.

3. The machine of claim 1, further comprising a first inertial measurement unit (IMU) disposed proximal to the first surface profiler and configured to measure an acceleration of the cart.

4. The machine of claim 3, wherein the processor is further configured to filter the output received from the first surface profiler using output received from the first IMU.

5. The machine of claim 3, further comprising a second inertial measurement unit (IMU) disposed on the actuating tool and configured to measure an acceleration of the actuating tool.

6. The machine of claim 5, wherein the processor is further configured to adjust a position of the actuating tool based on output received from the second IMU.

7. The machine of claim 1, wherein the actuating tool comprises at least one of a grinding head, screed, and milling bit.

8. The machine of claim 1, wherein the processor is further configured to:
   identify a starting point on the surface by identifying a feature of the surface present in the topography data; and
   begin operation of the cart when the cart is at the starting point.

9. The machine of claim 8, wherein the feature of the surface comprises at least one of a geometrical shape and stamped plate.

10. A system comprising:
    one or more processors; and
    at least one computer-readable storage medium having stored therein instructions which, when executed by the one or more processors, cause the system to:
    generate topography data of a surface based on output received from a first surface profiler disposed on a leading surface of a cart and a positional sensor;
    generate intermediate data of the surface based on output received from a second profiler disposed on an actuating tool and the positional sensor;
    compare the intermediate data with the topography data to calculate an offset; and
    control motion of the cart traveling on the surface based on the offset, the cart having an actuating tool to manipulate the surface.

11. The system of claim 10, wherein the instructions further cause the system to:
    generate best-fit data based on the topography data; and
    compare the intermediate data with the best-fit data to steer the cart.

12. The system of claim 10, wherein the instructions further cause the system to filter the output received from the first surface profiler using output received from a first inertial measurement unit (IMU) disposed on the cart.

13. The system of claim 12, wherein the instructions further cause the system to adjust a position of the actuating tool based on output received from a second inertial measurement unit (IMU) disposed on the actuating tool.

14. A method for controlling motion of a machine, the method comprising:
  generating topography data of a surface on which a machine travels based on output received from a first surface profiler disposed on the machine and a positional sensor;
  generating intermediate data of the surface based on output received from a second profiler and the positional sensor, the second profiler disposed on an actuating tool of the machine;
  comparing the intermediate data with the topography data to calculate an offset; and
  controlling motion of the machine based on the offset.

15. The method of claim 14, wherein the method further comprises:
  generating best-fit data based on the topography data; and
  comparing the intermediate data with the best-fit data to steer the machine.

16. The method of claim 14, further comprising filtering the output received from the first surface profiler using output received from a first inertial measurement unit (IMU).

17. The method of claim 16, further comprising adjusting a position of the actuating tool based on output received from a second inertial measurement unit (IMU) disposed on the actuating tool.

18. The method of claim 14, wherein the actuating tool comprises at least one of a grinding head, screed, and milling bit.

19. The method of claim 14, wherein the method further comprises:
  identifying a starting point on the surface by identifying a feature of the surface present in the topography data; and
  beginning operation of the machine when the machine is at the starting point.

20. The method of claim 19, wherein the feature of the surface comprises at least one of a geometrical shape and stamped plate.

* * * * *